(12) United States Patent
Schaller et al.

(10) Patent No.: US 11,237,399 B2
(45) Date of Patent: Feb. 1, 2022

(54) OPTICAL BEAM SHAPING UNIT, DISTANCE MEASURING DEVICE AND LASER ILLUMINATOR

(71) Applicant: JENOPTIK Optical Systems GmbH, Jena (DE)

(72) Inventors: Uwe Schaller, Kahla (DE); Marco Friesel, Oberndorf (DE)

(73) Assignee: Jenoptik Optical Systems GmbH, Jena (DE)

( * ) Notice: Subject to any disclaimer, the term of this patent is extended or adjusted under 35 U.S.C. 154(b) by 441 days.

(21) Appl. No.: 16/242,796

(22) Filed: Jan. 8, 2019

(65) Prior Publication Data
US 2019/0146227 A1    May 16, 2019

Related U.S. Application Data

(63) Continuation of application No. PCT/EP2017/067095, filed on Jul. 7, 2017.

(30) Foreign Application Priority Data

Jul. 8, 2016 (DE) ................. 10 2016 112 557.1

(51) Int. Cl.
*G02B 27/09* (2006.01)
*G02B 27/20* (2006.01)
(Continued)

(52) U.S. Cl.
CPC ........ *G02B 27/0955* (2013.01); *G01S 7/4814* (2013.01); *G01S 7/4816* (2013.01);
(Continued)

(58) Field of Classification Search
CPC ............ G02B 27/0955; G02B 27/0927; G02B 27/0916; G02B 27/20; G02B 19/0052;
(Continued)

(56) References Cited

U.S. PATENT DOCUMENTS 4,966,444 A   10/1990 Droegemueller et al.
5,638,475 A   6/1997 Gaebe
(Continued)

FOREIGN PATENT DOCUMENTS

CN   105372819 A   3/2016
DE   WO2010069634 A1 *  6/2010   ............... G01C 3/08
(Continued)

OTHER PUBLICATIONS

International Search Report dated Oct. 20, 2017 in corresponding application PCT/EP2017/067095.

*Primary Examiner* — Joseph P Martinez
(74) *Attorney, Agent, or Firm* — Muncy, Geissler, Olds & Lowe, P.C.

(57) ABSTRACT

An optical beam shaping unit for shaping a beam bundle. The optical beam shaping unit has at least one ball lens for shaping the beam bundle, wherein the ball lens allows a large portion of the light incident on the ball lens to pass through, and wherein the optical beam shaping unit has at least one optical unit which has a positive effective focal length and which is arranged in a beam path with the ball lens.

10 Claims, 5 Drawing Sheets

(51) Int. Cl.
*G01S 17/08* (2006.01)
*G01S 7/481* (2006.01)
*G01B 11/02* (2006.01)

(52) U.S. Cl.
CPC .......... *G01S 17/08* (2013.01); *G02B 27/0916* (2013.01); *G02B 27/0927* (2013.01); *G02B 27/20* (2013.01); *G01B 11/02* (2013.01)

(58) Field of Classification Search
CPC .. G02B 27/09; G02B 27/0938; G02B 27/095; G02B 7/027; H01S 3/005; G01C 3/00; G01S 17/08; G01S 17/66; G01B 11/02
See application file for complete search history.

(56) References Cited

U.S. PATENT DOCUMENTS

| | | | |
|---|---|---|---|
| 5,973,853 A | 10/1999 | Gaebe et al. | |
| 6,225,621 B1 | 5/2001 | Rogers et al. | |
| 8,192,030 B2 | 6/2012 | Mizushima et al. | |
| 8,559,023 B2 | 10/2013 | Tan et al. | |
| 8,842,260 B2 | 9/2014 | Juenemann et al. | |
| 8,908,157 B2 | 12/2014 | Eisele et al. | |
| 9,157,790 B2 | 10/2015 | Shpunt et al. | |
| 2002/0018217 A1 | 2/2002 | Weber-Grabau et al. | |
| 2003/0233029 A1 | 12/2003 | Alekseenko et al. | |
| 2008/0266862 A1 | 10/2008 | Shyshkin et al. | |
| 2012/0092642 A1 | 4/2012 | Göring | |
| 2015/0108376 A1 | 4/2015 | Kawaguchi | |

FOREIGN PATENT DOCUMENTS

| | | |
|---|---|---|
| DE | 202012012637 U1 | 7/2013 |
| EP | 0275068 A2 | 7/1988 |
| EP | 0468302 A2 | 1/1992 |
| EP | 0767392 A1 | 4/1997 |
| EP | 2363726 A1 | 9/2011 |
| JP | H0628773 U | 4/1994 |
| JP | H09133843 A | 5/1997 |
| JP | H11325885 A | 11/1999 |
| JP | 2002-544492 A | 12/2002 |
| JP | 2004536440 A | 12/2004 |
| JP | 2015-078946 A | 4/2015 |
| JP | 2015-514965 A | 5/2015 |
| WO | WO2008114502 A1 | 7/2010 |
| WO | WO2010108365 A1 | 9/2010 |
| WO | WO2011029645 A1 | 3/2011 |

\* cited by examiner

OPTICAL BEAM SHAPING UNIT, DISTANCE MEASURING DEVICE AND LASER ILLUMINATOR

This nonprovisional application is a continuation of International Application No. PCT/EP2017/067095, which was filed on Jul. 7, 2017, and which claims priority to German Patent Application No. 10 2016 112 557.1, which was filed in Germany on Jul. 8, 2016, and which are both herein incorporated by reference.

BACKGROUND OF THE INVENTION

Field of the Invention

The present invention relates to an optical beam shaping unit, to a distance measuring device and to a laser illuminator.

Description of the Background Art

Document EP 0 468 302 A2 discloses a distance measuring appliance. This distance measuring appliance is an interferometrically operating appliance, wherein the spherical lens acts as a resonator (multiple reflections or standing waves inside the sphere). Said resonator would not work well, i.e. no sufficiently pronounced interference pattern would form (which the appliance described in said document would require to function), if the spherical lens used therein were highly transmissive (in the crucial wavelength range).

US 2002/0018217 A1 discloses an optical beam shaping unit for shaping a ray bundle, wherein the optical beam shaping unit has at least one spherical lens for shaping the ray bundle, wherein the spherical lens allows a major portion of light that is incident on the spherical lens to pass and wherein the optical beam shaping unit has at least one optical unit with a positive effective focal length, which is arranged in one beam path with the spherical lens.

SUMMARY OF THE INVENTION

It is therefore an object of the present invention to provide an improved optical beam shaping unit.

In an exemplary embodiment, an optical beam shaping unit for shaping a ray bundle is provided. The optical beam shaping unit has at least one spherical lens for shaping the ray bundle, wherein the spherical lens allows a major portion of light that is incident on the spherical lens to pass and wherein the optical beam shaping unit has at least one optical unit with a positive effective focal length, which is arranged in one beam path with the spherical lens.

An optical beam shaping unit can be, for example, a device for optically deflecting or refracting a ray bundle. A spherical lens can be a lens which is substantially spherical. The spherical lens can be embodied to image the ray bundle from an object plane onto an image plane. For example, the spherical lens can be made from glass or a transparent plastic. The spherical lens can be produced in particular for example from a sapphire material having a high refractive index. The spherical lens can be, for example, a mass product for fiber coupling, as is used for example for lens connectors for connecting optical waveguides. The spherical lens can be, for example, part of a laser diode collimator of the optical beam shaping unit. The spherical lens is intended to allow the major portion, i.e. at least half the light that is incident on the spherical lens to pass, i.e. be transparent or transmissive for this portion of the light. The spherical lens is preferably transparent for at least three quarters of the light that is incident on the spherical lens; specifically, the spherical lens should be transparent or transmissive for at least 80 percent or, even more expediently, for at least 90 percent of the light that is incident on the spherical lens. The optical unit can be a unit having a positive effective focal length. For example, the optical unit can be embodied for collimating the ray bundle and/or the optical unit can be, for example, a lens, a lens system or a mirror. The lens is designed (layer design) to transmit the physically maximum possible portion of the light (limits are the Fresnel losses).

The approach described here is based on the finding that, by using a spherical optical unit for shaping a ray bundle within an optical beam shaping unit, a structural length of the optical beam shaping unit can be minimized. Another advantage is the simple variability of structural length and focal length and simplified adjustment. Due to the fact that expensive lenses with correspondingly expensive mounts and installation can be dispensed with and simple mounting technology, such as for example ridge mounting, can be used, it is additionally possible to significantly reduce the manufacturing costs of the optical beam shaping unit.

In accordance with an exemplary embodiment, the optical beam shaping unit comprises at least one light source for producing the ray bundle. The spherical lens can be embodied to image the ray bundle, which is produced by the light source, onto the optical element. A light source can be understood to mean, for example, a light-emitting diode or a laser diode. The spherical lens can here be arranged in a beam path of the ray bundle between the optical unit and the light source. For example, a distance between the spherical lens and the light source or a distance between the spherical lens and the optical unit can be variable. With this embodiment it is possible, for example, in the case of an optical beam shaping unit which is installed in a distance measuring device to vary the resulting focal length of the arrangement, as a result of which a change in the divergence of a transmission or receiving channel is effected. The performance (such as the range) of the distance measuring device can be improved in this way. The spherical lens images the source (laser diode or APD, etc.) into an intermediate image plane, which represents the focal plane of the optical element. The improved range here depends, in addition to further factors, substantially on the divergence of the laser beam which is influenced by distance variation.

The optical unit can be embodied as a converging lens, mirror and/or lens system. The optical unit can be embodied, for example, as a planoconvex converging lens. Such an optical unit can be provided particularly cost-effectively. The planoconvex lens can be an aspheric lens, which is expensive. In accordance with a particular embodiment for use here, however, it is produced by blank molding and is therefore cost-effective.

The light source can be embodied to emit a laser beam as the ray bundle. In particular, the light source can be embodied in the form of a light diode. Depending on the embodiment, the optical beam shaping unit can have a laser diode. Here, single stacks, stacked individual bars or nanostack laser diodes can be used.

The light source can emit the ray bundle in a wavelength range Lambda_B and the spherical lens allows a major portion of light that is incident on the spherical lens in the wavelength range Lambda_B, preferably only in the wavelength range Lambda_B to pass.

The spherical lens and/or the optical unit can be embodied so as to be displaceable in a z-direction z. For example, the spherical lens can be held in a first mount. For example, the optical unit can be held in a second mount. Both the assembly of spherical lens and first mount and the assembly of optical unit and second mount can be embodied so as to be displaceable. With this embodiment, it is possible to set a divergence of the ray bundle after the optical unit.

The light source can be embodied to be displaceable in the z-direction z. With such an embodiment, it is possible in light sources having an astigmatic radiation pattern to produce a predefined beam cross section.

The optical beam shaping unit can also have a detector apparatus for detecting an incident ray bundle. In addition or alternatively, the optical beam shaping unit can have at least one further spherical lens. Here, the further spherical lens can be embodied to steer the incident ray bundle onto the detector apparatus. The incident ray bundle can be, for example, the ray bundle that was emitted by the light source in as far as it is steered back to the optical beam shaping unit by reflection at a remote object. A detector apparatus can be understood to mean a light-sensitive component, for example in the form of a camera, a photodiode or a CCD line. For example, the light source, the spherical lens and the optical system with positive EFL (effective focal length) can represent a transmission channel of the optical beam shaping unit, while the detector apparatus and the further spherical lens and the optical system with positive EFL can represent a receiving channel of the optical beam shaping unit. Depending on the embodiment, the transmission channel and the receiving channel can be spatially separate channels or one and the same channel. In the latter case, the spherical lens can serve to steer the incident ray bundle onto the detector apparatus and also, in the opposite direction, to steer the ray bundle produced by the light source onto the optical element. With this embodiment, a distance measurement using e.g. time-of-flight measurement or phase shift measurement in the case of installation of the optical beam shaping unit in a distance measuring device is made possible.

The optical beam shaping unit can have at least one optical additional unit for steering the incident ray bundle onto the further spherical lens. The optical additional unit can be, for example, a lens, a lens system or a mirror. The optical additional unit can be embodied to focus the incident ray bundle onto the object plane or image plane of the spherical lens. With this embodiment, the incident ray bundle can be imaged in a targeted fashion onto the object plane or image plane of the further spherical lens.

Particularly advantageous is an embodiment, in which a distance measuring device or a laser illuminator (such as a laser pointer for assisting a presentation that is imaged by a presenter on a projection screen or a target designator) with an optical beam shaping unit in accordance with a variant introduced here is provided. For example, the distance measuring device or the laser illuminator can include a semiconductor laser transmitter, or the distance measuring device can include a semiconductor laser receiver.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
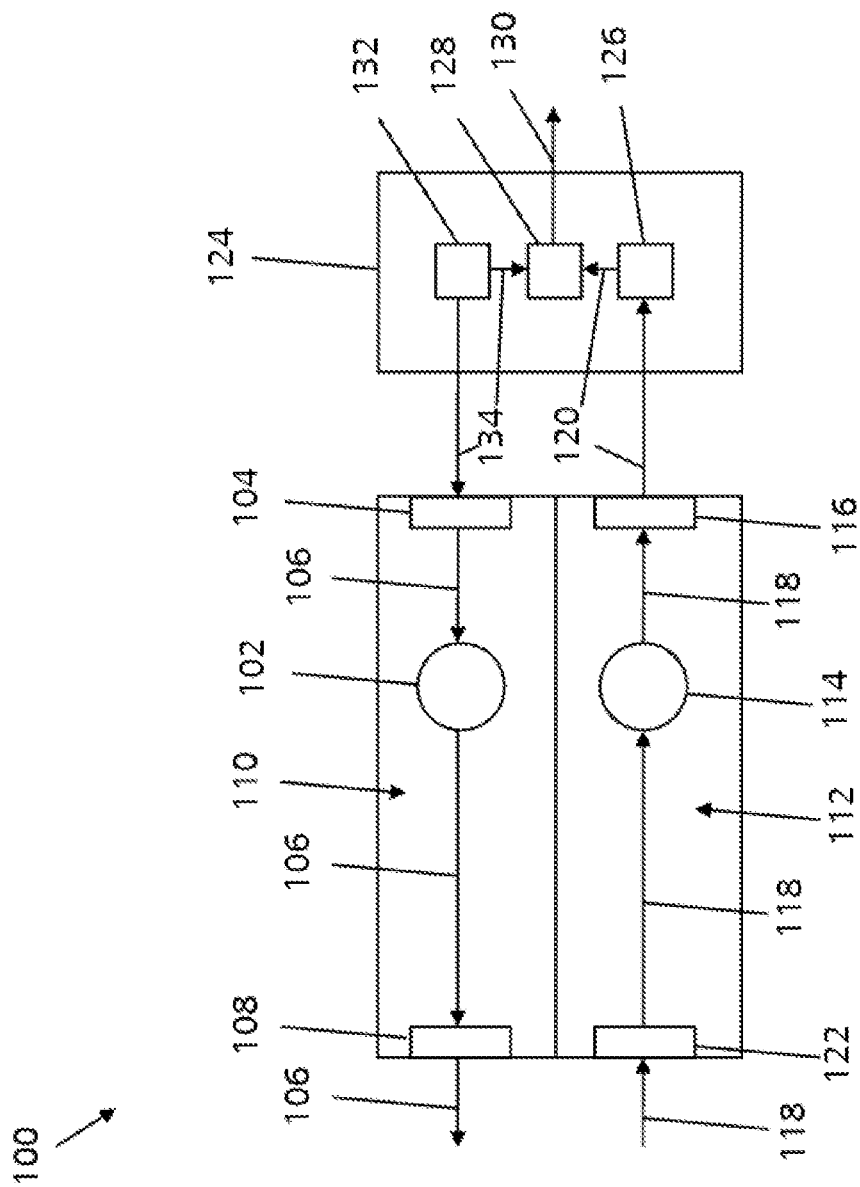
FIG. 1 shows a schematic illustration of a distance measuring device in accordance with an exemplary embodiment.

FIG. 1 shows a schematic illustration of a distance measuring device 100 with an optical beam shaping unit in accordance with an exemplary embodiment. The distance measuring device 100 comprises a spherical lens 102, which is embodied to shape a ray bundle 106, in the present case a laser beam, which is emitted by a light source 104. The ray bundle 106 is indicated schematically as an arrow in FIG. 1. In reality, the ray bundle 106 is a ray bundle made up of a plurality of partial ray bundles.

The spherical lens 102 is arranged between the light source 104 and an optical unit 108, such as a converging lens. The spherical lens 102 here images the ray bundle 106 in a suitable manner on the object plane or image plane of the optical unit 108. The optical unit 108 is embodied to collimate the ray bundle 106 which is imaged by the spherical lens 102.

The spherical lens 102 has a diameter between 0.5 mm and 8 mm depending on the exemplary embodiment.

The light source 104, the spherical lens 102 and the optical unit 108 form a transmission channel 110 of the distance measuring device 100. In addition to the transmission channel 110, the distance measuring device 100 in accordance with the exemplary embodiment shown in FIG. 1 has a receiving channel 112, which comprises a further spherical lens 114 and a detector apparatus 116. The further spherical lens 114 and the further optical unit 122 are embodied to focus a ray bundle 118, which is reflected into the transmission channel 110 and is indicated here likewise as an arrow, onto the detector apparatus 116 for detecting the incident ray bundle 118. As a consequence of the detection, the detector apparatus 116 outputs a detector signal 120.

In addition, an optical additional unit 122, for example in the form of a further converging lens, is connected upstream of the further spherical lens 114. The optical additional unit 122 is embodied to steer the incident ray bundle 118 in a suitable manner onto the object plane or image plane of the spherical lens 114.

As can be seen in FIG. 1, the transmission channel 110 and the receiving channel 112 are arranged in mutually neighboring fashion. The two channels 110, 112 furthermore extend here substantially parallel with respect to one another. As a result, the structural form of the distance measuring device 100 can be kept as compact as possible.

The light source 104 and the detector apparatus 116 are connected in each case to a device 124. The device 124 comprises a read unit 126 for reading the detector signal 120. The read unit 126 passes on the detector signal 120 to an ascertainment unit 128 for ascertaining a measurement value 130 that is representative of the distance using the detector signal 120.

The device 124 comprises an optional control unit 132 for actuating the light source 104 by way of a corresponding actuation signal 134. By way of example, the control unit 132 transfers the actuation signal 134 additionally to the ascertainment unit 128, wherein the ascertainment unit 128 is embodied to ascertain the measurement value 130 furthermore using the actuation signal 134.

Figure 2:
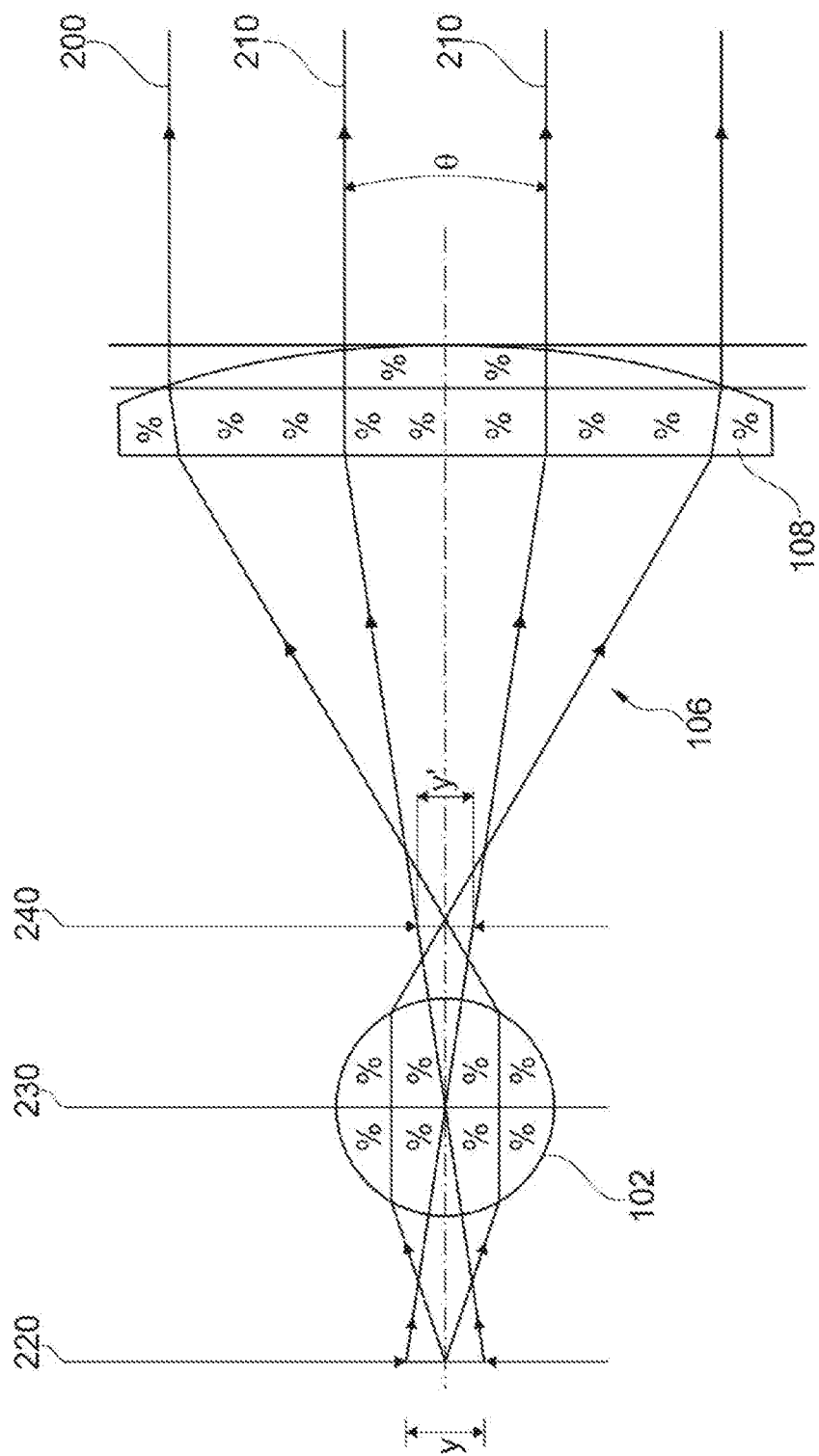
FIG. 2 shows a schematic illustration of an optical beam shaping unit in accordance with an exemplary embodiment.

FIG. 2 shows a schematic illustration of a beam path in an optical beam shaping unit in accordance with an exemplary embodiment, for example a distance measuring device 100 described previously on the basis of FIG. 1. The optical beam shaping unit has the spherical lens 102 and the optical unit 108, which in this case is designed in the form of an aspheric planoconvex lens. In contrast to FIG. 1, the ray bundle 106 is here illustrated as a ray bundle with the aperture ray 200 and the field ray 210. An object y in the object plane 220 is imaged by the spherical lens 102 onto the image plane 240 of the spherical lens 102, which results in an image height y' in this image plane 240 of the spherical lens 102. The field rays 210 here exhibit a divergence 8 between the transmitter and the receiver. The field rays begin at the peripheral points of the object (i.e. in this case of the laser diode) and form the marginal rays of the divergence after the collimation.

In summary, it can be noted that in accordance with the approach proposed here the first optical system is designed as a transparent, highly transmissive sphere. By setting the object distance (i.e. of the object plane of the source from the main plane of the spherical lens), a specific image distance (main plane of the spherical lens—image plane of the source) and consequently an imaging scale that is defined and variable within large limits is obtained in accordance with the imaging equation, which will be described further below. This means that the image size of the radiation source or receiving surface can be decreased or increased. With the same focal length (EFL) of the second optical system (here an aspheric individual lens), this results in a different divergence of the laser radiation and of the reception ray bundle.

$\theta_{beam} = y'/f_2' =$ image size of the first optical system/EFL of the second optical system; wherein the focal length $f_2'$ in FIG. 2 corresponds to the distance between the main plane of the lens 108 and the plane 240.

That means, if the imaging scale $\beta' = y'/y =$ image size after imaging by the first optical system/object size of the source is less than 1, a decreased real image of the source will be produced and, with the same focal length $f_2'$, a smaller resulting divergence will be obtained.

If the structural length of the entire optical beam shaping unit (TOTR) is intended to be short, the first optical system should have an extremely short focal length.

Ideally suited for this purpose is a sphere which is available as standard with diameters in the range 0.5 mm to 8 mm. Especially the diameters from 0.5 mm to 2 mm are of interest here (focal lengths with sapphire material from 0.3 mm to 1.2 mm).

Due to the very short object back focal distances (object plane-main plane of the first optical system) and the small radiation apertures of the laser source, the optically effective area on the sphere is limited to an area near the axis. Only for this reason do the imaging aberrations of the sphere remain small. The remaining imaging aberrations (primarily spherical aberrations) are corrected by the aspheric shape of the second optical system, as is described in the exemplary embodiment.

Figure 3:
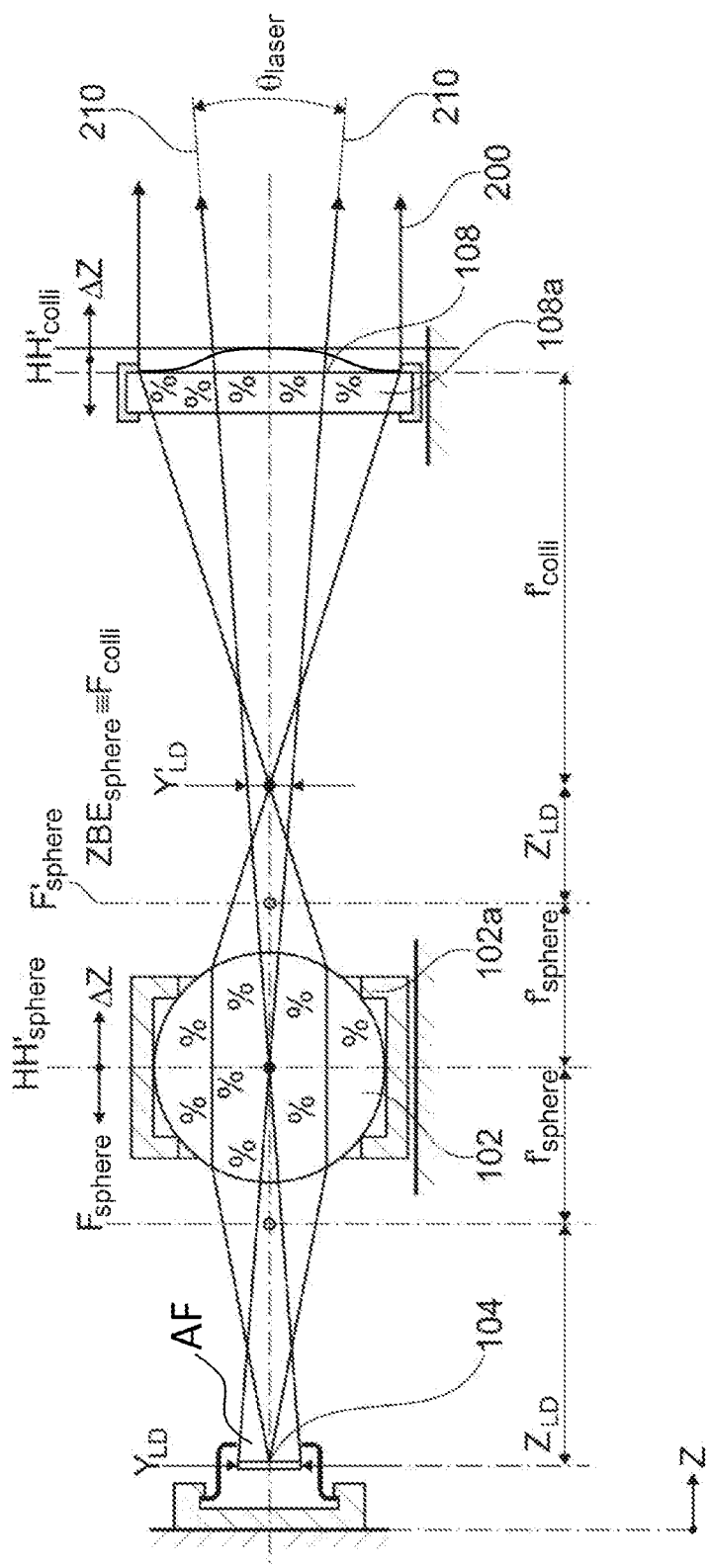
FIG. 3 shows a schematic illustration of an optical beam shaping unit in accordance with an exemplary embodiment.

FIG. 3 shows a schematic illustration of a beam path in an optical beam shaping unit in accordance with an exemplary embodiment, for example a distance measuring device 100 described previously on the basis of FIG. 1. The optical beam shaping unit has the spherical lens 102 and the optical unit 108, which in this case is designed in the form of an aspheric planoconvex lens.

In distance measuring devices, as small a divergence as possible of the laser radiation from a defined radiation surface AF of a light source 104 should generally be achieved, i.e. that due to the spherical lens 102, an image of decreased size of the radiation surface must be produced in the intermediate image plane $ZBE_{sphere}$ of the arrangement. In the exemplary embodiment, the spherical lens 102 is held in a mount 102a which is displaceable in the z-direction. If this assembly is displaced in the z-direction, i.e. if the distance $Z_{LD}$ is changed, the distance of the radiation surface AF from the main plane $HH'_{sphere}$ of the spherical lens 102 changes. Here, the location of the intermediate image $ZBE_{sphere}$ also changes in accordance with the known relation $z'_{LD} = f^2 sphere / z_{LD}$ (paraxial imaging equation). The optical unit 108, which is mounted in a further mount 108a and embodied as a collimator, is likewise displaceable in the z-direction and is displaced such that the focal plane $F_{colli}$ of the collimator 108 again coincides with the intermediate image plane $ZBE_{sphere}$ of the spherical lens 102. This ensures clean collimation of the ray bundle exiting from the radiation surface AF. The result is a laser divergence which is proportional to the intermediate image in accordance with the formula: $\tan \Theta = y_{LD}/f'_{colli}$.

Assuming, for example, 1:1 imaging of the exit surface AF into the $ZBE_{sphere}$ and if a spherical lens 102 of 1 mm diameter is selected, the result of a displacement of the spherical lens 102 in the z-direction of 1 mm is halving of the initial laser divergence.

Figure 5:
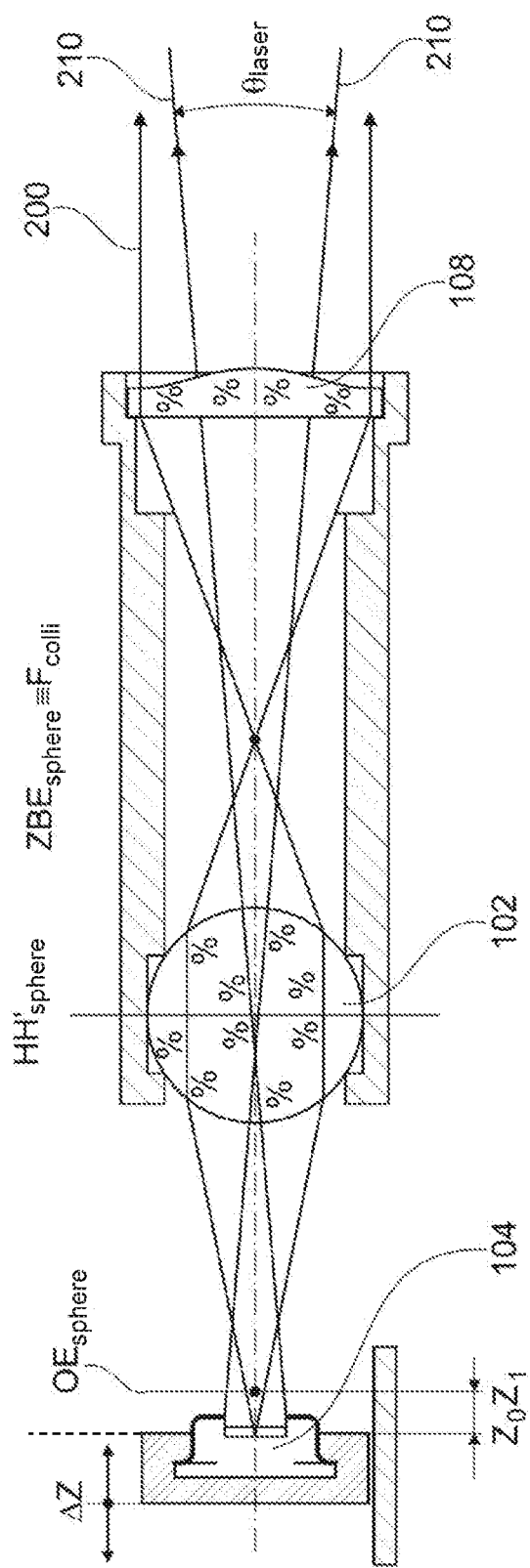
FIG. 5 shows a schematic illustration of an optical beam shaping unit in accordance with an exemplary embodiment.

FIG. 5 shows a schematic illustration of a beam path in an optical beam shaping unit in accordance with an exemplary embodiment, for example a distance measuring device 100 described previously on the basis of FIG. 1. The optical beam shaping unit has the spherical lens 102 and the optical unit 108, which in this case is designed in the form of an aspheric planoconvex lens.

This further exemplary embodiment is intended to show how it is possible, by way of the described arrangement, to vary the relation of meridional and sagittal extent of the laser beam in the far field.

Figure 4:
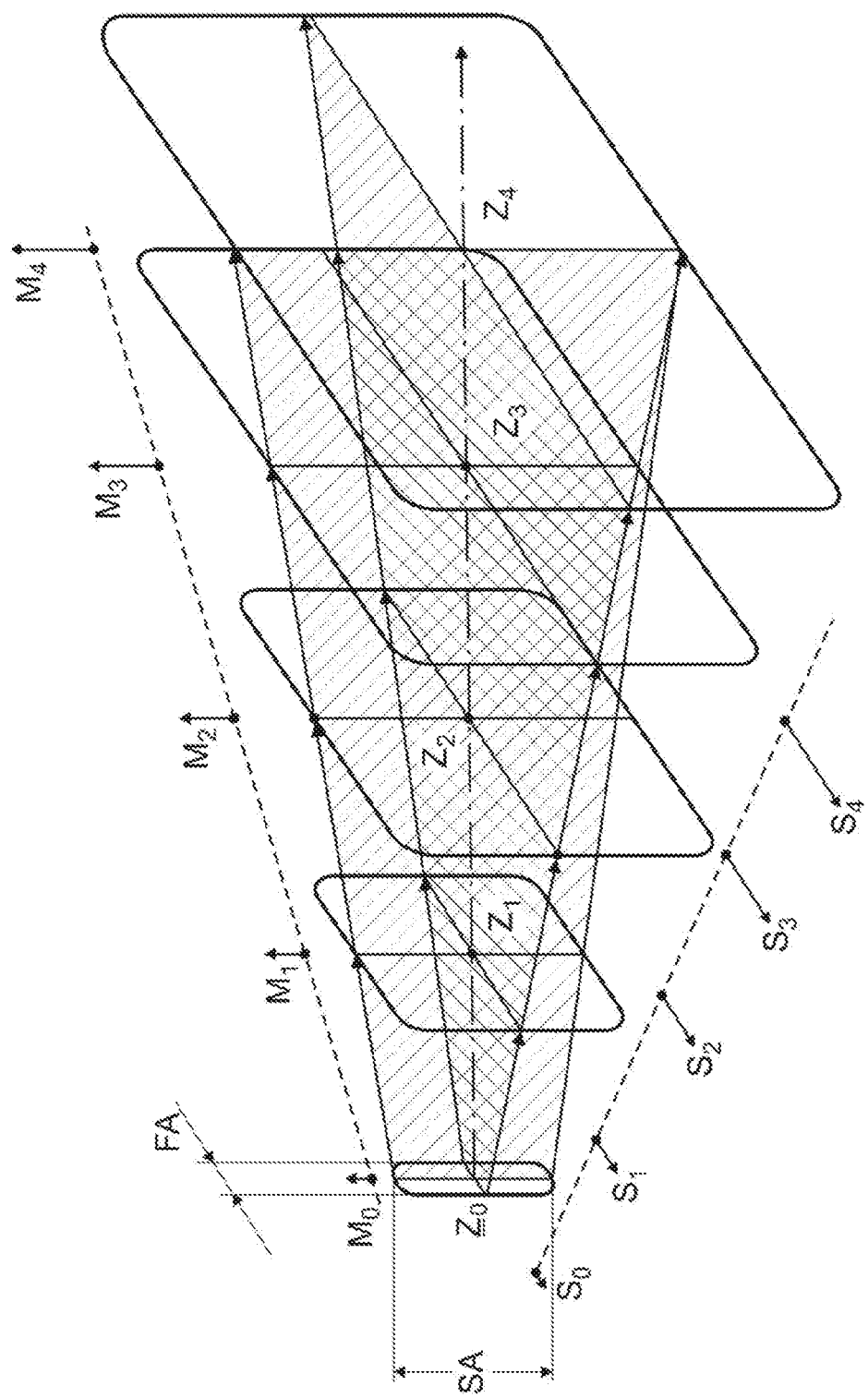
FIG. 4 shows a schematic illustration of a radiation pattern of a light source according to an exemplary embodiment of the invention.

Due to their structure, semiconductor laser diodes have a laser exit opening in the direction of the slow axis (SA) of 80 µm to approximately 200 µm and in the direction of the fast axis (FA) of 1 µm to approximately 10 µm. The semiconductor laser diodes used in laser measurement technology have a strongly astigmatic radiation pattern. Typical radiation angles are here 6° to 15° in the SA and 20° to 25° in the FA. FIG. 4 qualitatively shows such a radiation pattern. The figure clearly shows how the relation $S_0/M_0, \ldots S_4/M_4$ continuously changes in dependence on the z-position ($Z_0, \ldots Z_4$).

When using such semiconductor laser diodes in laser distance measuring devices or laser illuminators, the aim is to produce a beam cross-section that is as square as possible ($Z_1$), but at least a predefined beam cross-section ($Z_2, \ldots Z_4$).

An arrangement for producing a predefined beam cross-section is shown in FIG. 5.

The optical arrangement, for example a distance measuring device, is identical to the basic arrangement shown in FIG. 1. However, in this exemplary embodiment in accordance with FIG. 5, the laser diode, which is embodied as the light source 104, is arranged so as to be displaceable in the z-direction, wherein the location of the spherical lens 102 with respect to the collimator 108 is not variable and the intermediate image plane of the spherical lens $ZBE_{sphere}$ coincides with the focal plane $F_{colli}$ of the collimator 108.

Due to the displacement of the laser diode 104 in the z-direction, always different beam cross sections of the laser aperture ($S_1$-$M_1$ ... $S_4$-$M_4$) from FIG. 4 appear in the object plane $OE_{sphere}$ of the spherical lens 102. What are formed in the image plane of the spherical lens $ZBE_{sphere}$ in meridional and sagittal direction are proportional intermediate images. These are imaged (collimated) to the far field by the collimator 108. In dependence on the z-location ($Z_1$ ... $Z_4$ in FIG. 4), laser cross sections having different meridional and sagittal extent ratio are therefore obtained. For example, if the laser diode 104 is displaced such that the z-position $Z_1$ in FIG. 4 is positioned in the object plane of the spherical lens 102, the result is a square beam cross section in the far field.

The exemplary embodiments described and shown in the figures are selected purely by way of example. Different exemplary embodiments may be combined with one another in full or in relation to individual features. It is also possible to supplement an exemplary embodiment with features of a further exemplary embodiment.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An optical beam shaping unit for shaping a beam, the optical beam shaping unit comprising:
   at least one spherical lens for shaping the beam, wherein the spherical lens allows a major portion of light that is incident on the spherical lens to pass;
   at least one optical unit with a positive effective focal length, which is arranged in one beam path with the spherical lens;
   at least one light source for producing the beam; and
   a detector apparatus for detecting an incident beam,
   wherein the spherical lens and/or the optical unit are adapted to be displaceable in a z-direction with respect to a coordinate system xyz to set a divergence of the beam downstream of the optical unit,
   wherein the z-direction corresponds to a propagation direction of the beam, and
   wherein the at least one spherical lens is adapted to image the beam in the direction of the optical unit.

2. The optical beam shaping unit as claimed in claim 1, wherein the optical unit is a converging lens, a mirror or a lens system.

3. The optical beam shaping unit as claimed in claim 1, wherein the light source emits a laser beam as the beam, or wherein the light source is a laser diode.

4. The optical beam shaping unit as claimed in claim 1, wherein the light source emits the beam in a wavelength range Lambda_B and the spherical lens allows a major portion of light that is incident on the spherical lens in the wavelength range Lambda_B to pass.

5. The optical beam shaping unit as claimed in claim 1, wherein the light source is adapted to be displaceable in the z-direction.

6. The optical beam shaping unit as claimed in claim 1, further comprising at least one further spherical adapted to guide the incident beam onto the detector apparatus.

7. The optical beam shaping unit as claimed in claim 6, further comprising one optical additional unit for guiding the incident beam onto the further spherical lens.

8. A laser illuminator comprising an optical beam shaping unit as claimed in claim 1.

9. A distance measuring device with an optical beam shaping unit for shaping a beam, the optical beam shaping unit comprising:
   at least one spherical lens for shaping the beam, wherein the spherical lens allows a major portion of light that is incident on the spherical lens to pass;
   at least one optical unit with a positive effective focal length, which is arranged in one beam path with the spherical lens;
   at least one light source for producing the beam; and
   a detector apparatus for detecting an incident beam,
   wherein the spherical lens and/or the optical unit are adapted to be displaceable in a z-direction with respect to a coordinate system xyz to set a divergence of the beam downstream of the optical unit,
   wherein the z-direction corresponds to a propagation direction of the beam, and
   wherein the at least one spherical lens is adapted to image the beam in the direction of the optical unit.

10. The distance measuring device of claim 9, wherein the spherical lens comprises a ball lens.

* * * * *